US007380178B2

(12) United States Patent
Park et al.

(10) Patent No.: US 7,380,178 B2
(45) Date of Patent: May 27, 2008

(54) METHOD AND APPARATUS OF RECORDING DATA IN THE OPTICAL RECORDING MEDIUM

(75) Inventors: Yong Cheol Park, Kyonggi-do (KR); MyongGu Lee, Kyonggi-do (KR); Jong In Shin, Kyonggi-do (KR); Kyu Hwa Jeong, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 589 days.

(21) Appl. No.: 10/878,121

(22) Filed: Jun. 29, 2004

(65) Prior Publication Data

US 2005/0022053 A1 Jan. 27, 2005

Related U.S. Application Data

(62) Division of application No. 09/359,646, filed on Jul. 26, 1999, now Pat. No. 6,782,488.

(30) Foreign Application Priority Data

| Jul. 28, 1998 | (KR) | ................... 98-30320 |
| Aug. 1, 1998 | (KR) | ................... 98-31406 |
| Sep. 24, 1998 | (KR) | ................... 98-39797 |

(51) Int. Cl.
*G06F 11/00* (2006.01)
(52) U.S. Cl. ..................... 714/47; 714/8; 714/769
(58) Field of Classification Search .................. 714/47, 714/769
See application file for complete search history.

(56) References Cited

U.S. PATENT DOCUMENTS

| 4,406,000 A | 9/1983 | Shoji et al. |
| 4,774,700 A | 9/1988 | Satoh et al. |
| 4,833,665 A | 5/1989 | Tokumitsu et al. |
| 4,949,326 A | 8/1990 | Takagi et al. |
| 4,972,398 A | 11/1990 | Wachi et al. |
| 5,075,804 A | 12/1991 | Deyring |
| 5,111,444 A | 5/1992 | Fukushima et al. |
| 5,212,676 A | 5/1993 | Yamabata et al. |

(Continued)

FOREIGN PATENT DOCUMENTS

CN 1164091 A 11/1997

(Continued)

*Primary Examiner*—Scott Baderman
*Assistant Examiner*—Loan Truong
(74) *Attorney, Agent, or Firm*—Birch, Stewart, Kolasch & Birch, LLP

(57) ABSTRACT

An optical recording medium record/playback apparatus manages defective areas in a rewritable optical recording medium. A linear replacement control (LRC) bit is added to a secondary defective list (SDL) entry to discriminate defective block information listed in the SDL entry, according to a linear replacement algorithm, from defective block information listed at the SDL entry, according to a skipping algorithm. This allows the apparatus to transmit correct information to a host. When a defective block requiring a new replacement block is found during recording or playing back data and the spare area is full, instead of carrying out the linear replacement, the LRC bit is set in the SDL entry, along with the location information of the defective block. This indicates that the SDL entry was made when the spare area was full. Thus, data is not written in, or read from, the defective block.

31 Claims, 10 Drawing Sheets

U.S. PATENT DOCUMENTS

| | | | |
|---|---|---|---|
| 5,235,585 A * | 8/1993 | Bish et al. ............... 369/53.17 |
| 5,237,553 A | 8/1993 | Fukushima et al. |
| 5,241,531 A | 8/1993 | Ohno et al. |
| 5,270,877 A | 12/1993 | Fukushima et al. |
| 5,271,018 A * | 12/1993 | Chan ......................... 714/710 |
| 5,283,790 A * | 2/1994 | Kawashita ..................... 714/7 |
| 5,303,219 A | 4/1994 | Kulakowski et al. |
| 5,404,357 A | 4/1995 | Ito et al. |
| 5,412,629 A | 5/1995 | Shirane et al. |
| 5,442,614 A | 8/1995 | Tamegai |
| 5,504,868 A | 4/1996 | Krakirian |
| 5,508,989 A | 4/1996 | Funahashi et al. |
| 5,526,335 A | 6/1996 | Tamegai |
| 5,528,571 A | 6/1996 | Funahashi et al. |
| 5,541,903 A | 7/1996 | Funahashi et al. |
| 5,553,045 A | 9/1996 | Obata et al. |
| 5,590,349 A | 12/1996 | Robinson et al. |
| 5,623,470 A | 4/1997 | Asthana et al. |
| 5,666,335 A | 9/1997 | Horibe |
| 5,715,221 A * | 2/1998 | Ito et al. ................... 369/47.14 |
| 5,721,726 A | 2/1998 | Kurnick et al. |
| 5,737,290 A | 4/1998 | Ohmori et al. |
| 5,739,519 A | 4/1998 | Tsuchiya |
| 5,740,349 A | 4/1998 | Hasbun et al. |
| 5,745,444 A | 4/1998 | Ichikawa et al. |
| 5,818,654 A | 10/1998 | Reddy et al. |
| 5,822,142 A * | 10/1998 | Hicken ......................... 360/53 |
| 5,841,748 A | 11/1998 | Yamamuro et al. |
| 5,844,911 A * | 12/1998 | Schadegg et al. ........... 714/710 |
| 5,848,438 A | 12/1998 | Nemazie et al. |
| 5,859,823 A | 1/1999 | Yamamuro et al. |
| 5,883,867 A * | 3/1999 | Yamamuro ............... 369/47.14 |
| 5,896,364 A | 4/1999 | Okazaki et al. |
| 5,914,928 A * | 6/1999 | Takahashi ................ 369/47.14 |
| 5,966,358 A | 10/1999 | Mine et al. |
| 5,999,505 A | 12/1999 | Yasui et al. |
| 6,025,966 A * | 2/2000 | Nemazie et al. ............... 360/53 |
| 6,031,804 A | 2/2000 | Yamamuro et al. |
| 6,038,209 A | 3/2000 | Satoh |
| 6,049,515 A | 4/2000 | Yamamuro et al. |
| 6,094,317 A | 7/2000 | Chung et al. |
| 6,094,723 A | 7/2000 | Otsuka et al. |
| 6,160,778 A | 12/2000 | Ito et al. |
| 6,212,647 B1 | 4/2001 | Sims et al. |
| 6,223,303 B1 * | 4/2001 | Billings et al. ................. 714/8 |
| 6,272,085 B1 | 8/2001 | Maeda et al. |
| 6,279,118 B1 | 8/2001 | Kang et al. |
| 6,282,365 B1 | 8/2001 | Gotoh et al. |
| 6,289,423 B1 | 9/2001 | Ozaki et al. |
| 6,292,445 B1 | 9/2001 | Ito et al. |
| 6,292,625 B1 | 9/2001 | Gotoh et al. |
| 6,301,432 B2 | 10/2001 | Miyawaki et al. |
| 6,314,235 B1 | 11/2001 | Gotoh et al. |
| 6,377,524 B1 | 4/2002 | Ko et al. |
| 6,389,569 B1 | 5/2002 | Chung et al. |
| 6,453,384 B1 | 9/2002 | Park et al. |
| 6,470,461 B1 * | 10/2002 | Pinvidic et al. ................. 714/8 |
| 6,480,446 B1 | 11/2002 | Ko et al. |
| 6,526,522 B1 | 2/2003 | Park et al. |
| 6,625,094 B1 | 9/2003 | Park et al. |
| 6,631,106 B1 * | 10/2003 | Numata et al. .......... 369/53.17 |
| 6,782,488 B1 | 8/2004 | Park et al. |
| 7,139,935 B2 | 11/2006 | Park et al. |
| 7,146,527 B2 | 12/2006 | Park et al. |
| 7,206,267 B2 | 4/2007 | Park et al. |
| 2001/0044873 A1 * | 11/2001 | Wilson et al. .................. 711/4 |
| 2003/0110411 A1 * | 6/2003 | Harari et al. ................... 714/8 |
| 2003/0196133 A1 | 10/2003 | Park et al. |
| 2004/0073832 A1 * | 4/2004 | Ko ................................. 714/8 |
| 2004/0153905 A1 | 8/2004 | Park et al. |

FOREIGN PATENT DOCUMENTS

| | | |
|---|---|---|
| EP | 0 357 049 A | 3/1990 |
| EP | 0 383 298 A | 8/1990 |
| EP | 0 559 468 A2 | 9/1993 |
| EP | 0 798 710 A | 3/1997 |
| EP | 0 837 472 A2 | 4/1998 |
| EP | 0 845 780 A1 | 6/1998 |
| EP | 0866456 A1 | 9/1998 |
| EP | 0 952 573 A2 | 10/1999 |
| GB | 2 332 555 A | 6/1999 |
| JP | 10-27396 A | 1/1989 |
| JP | 02-023417 A | 1/1990 |
| JP | 04-028061 A | 1/1992 |
| JP | 4-28061 A | 1/1992 |
| JP | 05-114247 A | 5/1993 |
| JP | 05-298836 A | 11/1993 |
| JP | 5-342759 A | 12/1993 |
| JP | 6-5001 A | 1/1994 |
| JP | 6-60550 A | 3/1994 |
| JP | 6-103577 A | 4/1994 |
| JP | 07-057397 A | 3/1995 |
| JP | 07-254229 A | 10/1995 |
| JP | 08-171461 A | 7/1996 |
| JP | 08-212708 A | 8/1996 |
| JP | 08 249 659 A | 9/1996 |
| JP | 9-231682 A1 | 9/1997 |
| JP | 09-259538 A | 10/1997 |
| JP | 9-259547 A | 10/1997 |
| WO | WO-97/07505 A1 | 2/1997 |
| WO | WO-97/35309 A1 | 9/1997 |
| WO | WO-98/14938 A | 4/1998 |

* cited by examiner

| b63 | b62 ...... b56 | b55 ...... b32 | b31 ..... b24 | b23 ...... b0 |
|---|---|---|---|---|
| FRM | reserved | sector number of first sector of defective block | reserved | sector number of first sector of replacement block |

FIG.4B

| 1 | blkA | 0 |

FIG.4C

| 0 | blkA | blkE |

FIG.4D

| 1 | blkA | blkE |

FIG.9

0  blkC  0

METHOD AND APPARATUS OF RECORDING DATA IN THE OPTICAL RECORDING MEDIUM

The present application is a divisional of U.S. patent application Ser. No. 09/359,646 filed on Jul. 26, 1999 now U.S. Pat. No. 6,782,488 for which priority is claimed under 35 U.S.C. § 120; and the present application claims priority of Patent Application No. 1998-30320 filed in the Republic of Korea on Jul. 28, 1998; Patent Application No. 1998-31406 filed in the Republic of Korea on Aug. 1, 1998; and Patent Application No. 1998-39797 filed in the Republic of Korea on Sep. 24, 2998, under 35 U.S.C. § 119. The entire contents of each of these applications are herein fully incorporated by reference.

BACKGROUND OF THE INVENTION

1. Field of the Invention

The present invention relates to an optical recording medium which allows rewriting, and more particularly to a method and apparatus of recording data in the optical recording medium, wherein defect areas can be managed.

2. Description of Related Art

An optical storage medium is generally divided into a read only memory (ROM), a write once read many (WORM) memory into which data can be written one time, and rewritable memories into which data can be written several times. Rewritable optical storage mediums, i.e. optical discs, include rewritable compact discs (CD-RW) and rewritable digital versatile discs (DVD-RW, DVD-RAM, DVD+RW).

The operations of writing and playing back data in a rewritable optical disc may be repeated. This repeated process alters the ratio of storage layers for recording data into the optical disc from the initial ratio. Thus, the optical discs lose its characteristics and generate an error during recording/playback. This degradation is indicated as a defective area at the time of formatting, recording on or playing back from an optical storage medium. Also, defective areas of a rewritable optical disc may be caused by a scratch on its surface, particles of dirt and dust, or errors during manufacture. Therefore, in order to prevent writing into or reading out of the defective area, management of such defective areas is necessary.

FIG. 1 shows a defect management area (DMA) in a lead-in area and a lead-out area of the optical disc to manage a defect area. Particularly, the data area is divided into a plurality of zones for the defect area management, where each zone is further divided into a user area and a spare area. The user area is where data actually written and the spare area is used when a defect occurs in the user area.

There are four DMAs in one disc, e.g. DVD-RAM, two of which exist in the lead-in area and two exist in the lead-out area. Because managing defective areas is important, the same contents are repeatedly recorded in all four DMAs to protect the data. Each DMA comprises two blocks of 32 sectors, where one block comprises 16 sectors. The first block of the DMA, called a DDS/PDL block, includes a disc definition structure (DDS) and a primary defect list (PDL). The second block of the DMA, called an SDL block, includes a secondary defect list (SDL). The PDL corresponds to a primary defect data storage and the SDL corresponds to a secondary defect data storage.

The PDL generally stores entries of defective sectors caused during the manufacture of the disc or identified when formatting a disc, namely initializing and re-initializing a disc. Each entry is composed of an entry type and a sector number corresponding to a defective sector. The SDL lists defective areas in block units, thereby storing entries of defective blocks occurring after formatting or defective blocks which could not be stored in the PDL during the formatting. As shown in FIG. 2, each SDL entry has an area for storing a sector number of the first sector of a block having defective sectors, an area for storing a sector number of the first sector of a block replacing the defective block, and reserved areas.

Also, each SDL entry is assigned a value of 1 bit for forced reassignment marking (FRM). A FRM bit value of 0 indicates that a replacement block is assigned and that the assigned block does not have a defect. A FRM bit value of 1 indicates that a replacement block has not been assigned or that the assigned replacement block has a defect. Thus, to record data in a defective block listed as a SDL entry, a new replacement block must be found to record the data. Accordingly, defective areas, i.e. defective sectors or defective blocks, within the data area are replaced with normal or non-defective sectors or blocks by a slipping replacement algorithm and a linear replacement algorithm.

The slipping replacement is utilized when a defective area or sector is recorded in the PDL. As shown in FIG. 3A, if defective sectors m and n, corresponding to sectors in the user area, are recorded in the PDL, such defective sectors are skipped to the next available sector. By replacing the defective sectors by subsequent sectors, data is written to a normal sector. As a result, the user area into which data is written slips and occupies the spare area in the amount equivalent to the skipped defective sectors.

The linear replacement is utilized when a defective block is recorded in the SDL or when a defective block is found during playback. As shown in FIG. 3B, if defective blocks m and n, corresponding to blocks in either the user or spare area, are recorded on the SDL, such defective blocks are replaced by normal blocks in the spare area and the data to be recorded in the defective block are recorded in an assigned spare area. To achieve the replacement, a physical sector number (PSN) assigned to a defective block remains, while a logical sector number (LSN) is moved to the replacement block along with the data to be recorded. Linear replacement is effective for non real-time processing of data. For convenience, a data which does not require real time processing is hereinafter called a personal computer (PC)-data.

If a replacement block listed in the SDL is found to be defective, a direct pointer method is applied to the SDL listing. According to the direct pointer method, the defective replacement block is replaced with a new replacement block and the SDL entry of the defective replacement block is modified into a sector number of the first sector of the new replacement block.

FIG. 4A shows a procedure to manage a defective block found while writing or reading data into or from the user area. FIGS. 4B~4D show embodiments of SDL entries generated according to the linear replacement algorithm. Each SDL entry has, in order, a FRM, a sector number of the first sector of the defective block, and a sector number of the first sector of the replacement block.

For example, if the SDL entry is (1, blkA, 0) as shown in FIG. 4B, a defective block has been newly found during the reproduction and is listed in the SDL. This entry indicates that a defect occurs in block blkA and that there is no replacement block. The SDL entry is used to prevent data from being written into the defective block in the next recording. Thus, during the next recording, the defective block blkA is assigned a replacement block according to the linear replacement.

An SDL entry of (0, blkA, blkE), shown in FIG. 4C, indicates that the assigned replacement block blkE has no defect and data to be written into the defective block blkA in the user area is written into the replacement block blkE in the spare area. An SDL entry of (1, blkA, blkE) shown in FIG. 4D, indicates that a defect occurs in the replacement block blkE of the spare area which replaced the defective block blkA of the user area. In such case, a new replacement block is assigned according to the direct pointer method.

FIG. 5 is a partial diagram of an optical disc recording/playback (R/P) device relating to the recording operation. The optical disc (R/P) device includes an optical pickup to write data into and playback data from the optical disc; a servo unit controlling the optical pickup to maintain a certain distance between an object lens of the optical pickup and the optical disc, and to maintain a constant track; a data processor either processing and transferring the input data to the optical pickup, or receiving and processing the data reproduced through the optical pickup; an interface transmitting and receiving data to and from an external host; and a micro processor controlling the components. The interface of the optical disc R/P apparatus is coupled to a host such as a PC, and communicates commands and data with the host.

If there is data to be recorded in an optical disc R/P apparatus, the host sends a recording command to the optical disc R/P apparatus. The recording command comprises a logical block address (LBA) designating a recording location and a transfer length indicating a size of the data. Subsequently, the host sends the data to be recorded to the optical disc R/P apparatus. Once the data to be written onto an optical disc is received, the optical disc R/P apparatus writes the data starting from the designated LBA. At this time, the optical disc R/P apparatus does not write the data into areas having by referring to the PDL and SDL which indicate defects of the optical disc.

Referring back to FIG. 4A, the optical disc R/P apparatus skips physical sectors listed in the PDL and replaces the physical blocks listed in the SDL, within the area between A and B, with assigned replacement blocks in the spare area during the recording. If a defective block not listed in the SDL or a block prone to an error is found during the recording or playback, the optical disc R/P apparatus considers such blocks as defective blocks. As a result, optical disc R/P apparatus searches for a replacement block in the spare area to rewrite the data corresponding to the defective block and lists the first sector's number of the defective block and the first sector's number of the replacement block at the SDL entry.

To perform the linear replacement, namely to write the data into the assigned replacement block in the spare area when finding a defective block (listed or not listed in the SDL), the optical disc R/P apparatus must move the optical pickup from the user area to the spare area and then back to the user area. Because moving the optical pickup may take time, a linear replacement interferes a real time recording.

Thus, defect area management methods for real time recording, such as audio visual apparatus, have been extensively discussed. One method is to use a skipping algorithm where a defective block is skipped and data is written into the next normal block, similarly to the slipping replacement algorithm. If this algorithm is employed, the optical pickup does not need to be moved to the spare area whenever a defective block is found, such that the time needed for moving the optical pickup can be reduced and the interference with the real time recording can be removed.

For example, if the PC-data which does not require real time processing, as shown in FIG. 4A, is received when the SDL is used, the linear replacement algorithm is executed upon finding defective blocks blkA and blkB. If the received data requires real time, as shown in the area between B and C of FIG. 4A, the skipping algorithm is used upon finding defective block blkC. Namely, the linear replacement is not performed. For linear replacement, the PSN of the defective block is maintained as is and the LSN of the defective block is moved to the replacement block. For the skipping algorithm, both the LSN and PSN of the defective block blkC are maintained as they are.

Accordingly, when the host reads the data recorded according to the skipping algorithm, the microprocessor transmits all data including data of defective blocks through the interface. However, the host cannot identify the data of the skipped defective block since it does not have information regarding the skipped defective blocks, resulting in an incorrect playback of the data. Therefore, the microprocessor of the optical disc R/P apparatus must instruct the optical pickup not to read the data of defective blocks among the data playback from the optical disc and transmitted to the host. Here, the information regarding the defective blocks, as shown in FIGS. 4B~4D, remains in the SDL and the microcomputer may transmit the information to the host, on request.

The SDL is information on defective blocks with respect to the linear replacement algorithm. However, the microprocessor cannot discriminate information recorded with respect to linear replacement from information recorded with respect to skipping algorithm not performing the linear replacement. Consequently, if skipping algorithm has been used, the microprocessor may transmit incorrect information to the host. Likewise, the host cannot identify the data of skipped defective blocks, resulting in an erroneous playback of data.

Moreover, because of the size of the spare may not be sufficient, the spare area may become full while the DMA has redundant areas for listing defective blocks at the PDL or SDL entries. If the spare area is full, a spare full flag in the DMA is set. The spare area may become full prior to the DMA when the initial allocation of spare area is insufficient or when the available spare area is quickly reduced due to defects, particularly burst defects occurring in the spare area. Because it is desirable to increase the recording capacity of the optical disc, a method of further reducing the size of the spare area has been considered. In such case, however, there is a higher possibility that the spare area will become full prior to the DMA.

Consequently, if the optical disc R/P apparatus finds a defective block that is not listed in the SDL or is listed in the SDL but requires a new replacement block as shown in FIGS. 4B~4D while recording or playing back data, it checks the spare full flag of the DMA. If the spare full flag is in a reset state which indicates that available spare areas remain, the apparatus records the data of the defective block in a replacement block in the spare area and lists a new SDL entry or modifies the existing SDL entry. On the other hand, if the spare full flag is in a set state, which indicates that the spare area is full, a linear replacement cannot be executed even if the DMA has redundant area. If the linear replacement cannot be executed when necessary, the management of defective area cannot be maintained. As a result, the disc cannot be used.

SUMMARY OF THE INVENTION

Accordingly, an object of the present invention is to solve at least the problems and disadvantages of the related art.

An object of the present invention is to provide an optical disc and a defect management method for managing defect of the optical disc according to whether a replacement block has been assigned.

Another object of the present invention is to provide a data recording method and apparatus which discriminately store and manage information on defective blocks within the optical disc according whether a replacement block has been assigned.

Still another object of the present invention is to provide an optical disc, a defect management method for managing defect of such optical disc, and data recording method and apparatus for storing information on defective blocks according to whether linear replacement is performed.

A further object of the present invention is to provide an optical disc, a defect management method for managing defect of such optical disc, and data recording method and apparatus for storing information on defective blocks without application of linear replacement if there is no available replacement area.

A still further object of the present invention is to provide an optical disc, a defect management method for managing defect of such optical disc, and data recording method and apparatus for discriminately storing information on defective blocks skipped for real time processing or skipped due to a full spare area, and information on defective blocks related to linear replacement algorithm.

A still further object of the present invention is to provide an optical disc, a defect management method for managing defect of such optical disc, and data recording method and apparatus for discriminately storing information on defective blocks listed at SDL entries by giving identification information to the SDL entries according to whether linear replacement is performed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an optical disc has a DMA for managing defects and comprises an area for recording identification information in the DMA. The identification information allows discrimination between when a replacement block has been assigned according to a linear replacement algorithm and when a replacement block is not assigned. The area for recording the identification information is assigned in a reserved area of a SDL entry in the DMA. The identification information indicates that a defective block was listed in the SDL either while data was recorded according to a skipping algorithm or when a spare area was full.

A defect management method of an optical disc according to an embodiment of the present invention comprises determining whether to assign a replacement block if a defective block is found during recording in the optical disc; and storing information on the defective block and storing identification information to discriminate a defective block with an assigned replacement block from a block without an assigned replacement block, based upon the results of the determination.

Information regarding a replacement block is not stored during real time recording. Also, information regarding a replacement block is not assigned when there is no available replacement area. The identification information is stored at a secondary defect list in a defect management area together with the defective block information. Moreover, the forced reassignment marking information is reset to 0. Furthermore, the defective block information discriminated based upon the identification information is notified to a host that transmits a recording command.

In another embodiment, a defect management method of an optical disc according to the present invention comprises detecting existence/non-existence of an available replacement area if a defective block is found while recording the data in the optical disc; and storing information on the defective block and identification information indicating that a replacement block is assigned if available replacement area exists or a replacement block is not assigned if available replacement area does not exist. Available replacement block is determined not to exist if the data is recorded by skipping the defective block. Also, available replacement block is determined not to exist if the spare area is full.

In still another embodiment, a data recording method of an optical disc comprises receiving data and information of areas where data will be written in the optical disc; reading defective area information of the optical disc; detecting whether the defective area information covers a defective block that is found during the recording; detecting whether a replacement block is assigned to the defective block based upon the identification information contained in the defective area information if the found defective block is covered by the defective area information, and if a replacement block is assigned, writing the data in the assigned replacement block and, if not, finding a new available replacement block to write the data therein; and determining whether the defective block will be replaced with a replacement block if the defective block is not covered by the defective area information, and storing information on the defective block and the identification information to discriminate if a replacement block is assigned to the defective block in the defect management area of the disc based upon a result of the determination. The identification information is represented with at least one bit of a reserved area at a secondary defect list within the defect management area.

Moreover, a real time data recording method of an optical disc according to the present invention comprises receiving data and information regarding the area where the data will be written in the optical disc; skipping a defective block and writing the data in a following normal block if the defective block is found during the real time recording; and storing information regarding the skipped defective block discriminately from information on a defective block replaced with a replacement block.

The identification information is set to indicate that the defective block is not replaced with a replacement block. If the defective block is found while recording the data by skipping defective blocks and if information regarding a replacement block for the defective block is listed at a secondary defect list entry, the replacement block information is maintained as is when the defective block information is stored.

Furthermore, an optical disc recording apparatus comprises a controller detecting a defective block and determining whether a replacement block is assigned to the defective block while recording the data; an optical pickup recording and playing back data in/from the optical disc according to control of the controller; and a storage unit storing information regarding the defective block and identification information to discriminate whether a replacement block is assigned to a defective block.

The storage unit does not store the replacement block during real time recording and represents this fact using the identification information. The storage unit also does not store the replacement block if there is no available replacement area and represents this fact using the identification information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The invention will be described in detail with reference to the following drawings in which like reference numerals refer to like elements wherein:

FIGS. 4B to 4D illustrate embodiments of SDL entries listing information regarding defective blocks occurring when recording or playing back data according to the linear replacement algorithm;

Figure 7A:
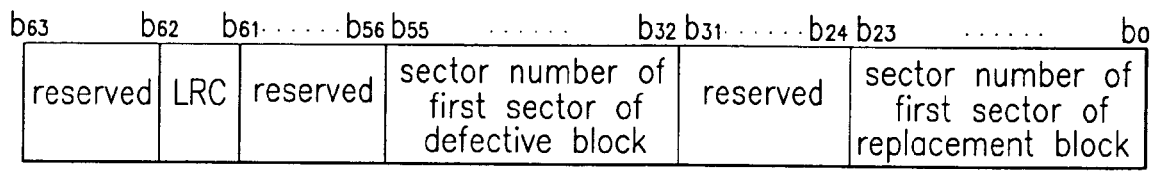
FIG. 7A illustrates assigning identification information to an SDL entry according to an optical disc defect managing method of the present invention.
Figure 7B:
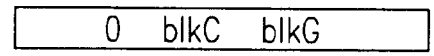
FIGS. 7B to 7D illustrate SDL entries discriminately listed while recording or playing back data according to the skipping algorithm and linear replacement algorithm using the identification information.
Figure 7C:
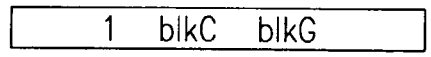
Figure 7D:
Figure 8A:
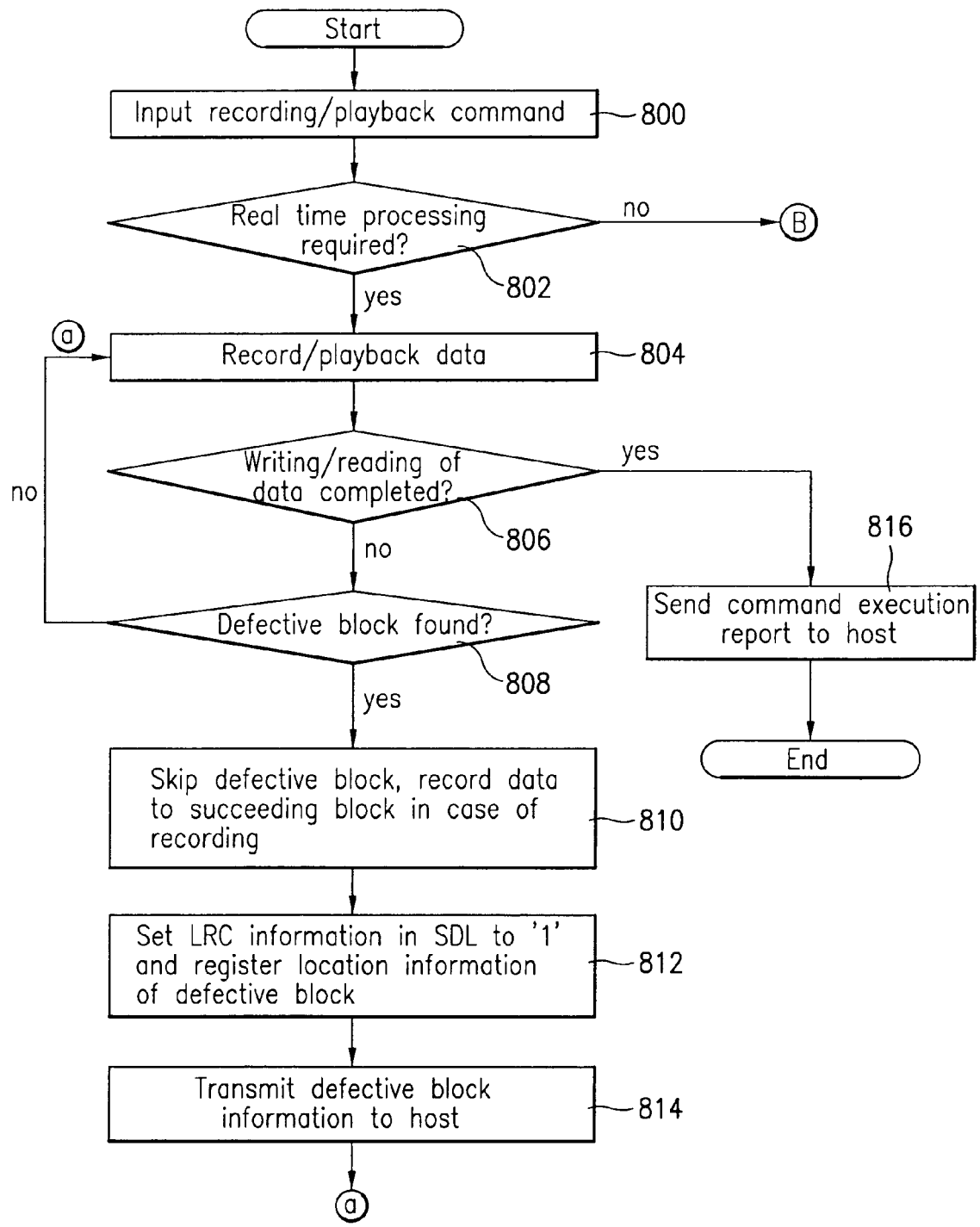
Figure 8B:
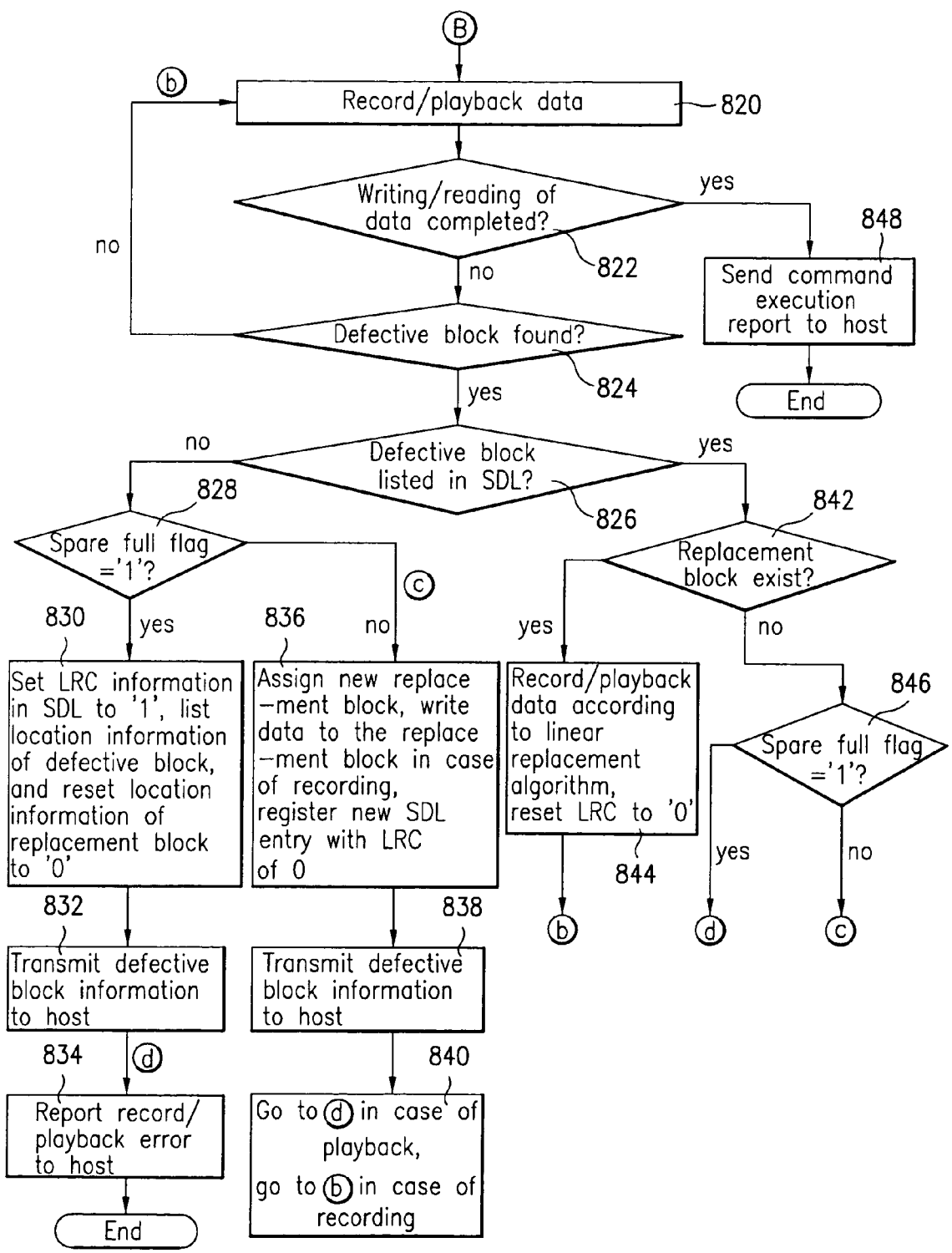

FIGS. 8A and 8B are flow charts showing how defective area is managed using the identification information of FIG. 7 according to an embodiment of the present invention; and FIG. 9 illustrates an SDL entry listed while recording or playing back data according to the skipping algorithm after changing a definition of FRM in the optical disc defect managing method according to an embodiment of the present invention.

DETAILED DESCRIPTION OF PREFERRED EMBODIMENTS

Reference will now be made in detail to the preferred embodiments of the present invention, examples of which are illustrated in the accompanying drawings. The present invention distinguishably lists information regarding defective blocks in the SDL according to whether linear replacement has been executed upon finding defective blocks while recording or playing back data in or from an optical disc. In one embodiment, the present invention distinguishably lists such information by assigning an identification information. In another embodiment, such information is distinguishably listed by changing a part of the FRM definition.

In the first embodiment of the present invention, information indicating whether or not a corresponding defective block is listed while data is recorded according to the linear replacement algorithm is written in a reserved area in the SDL entry.

Figure 6:
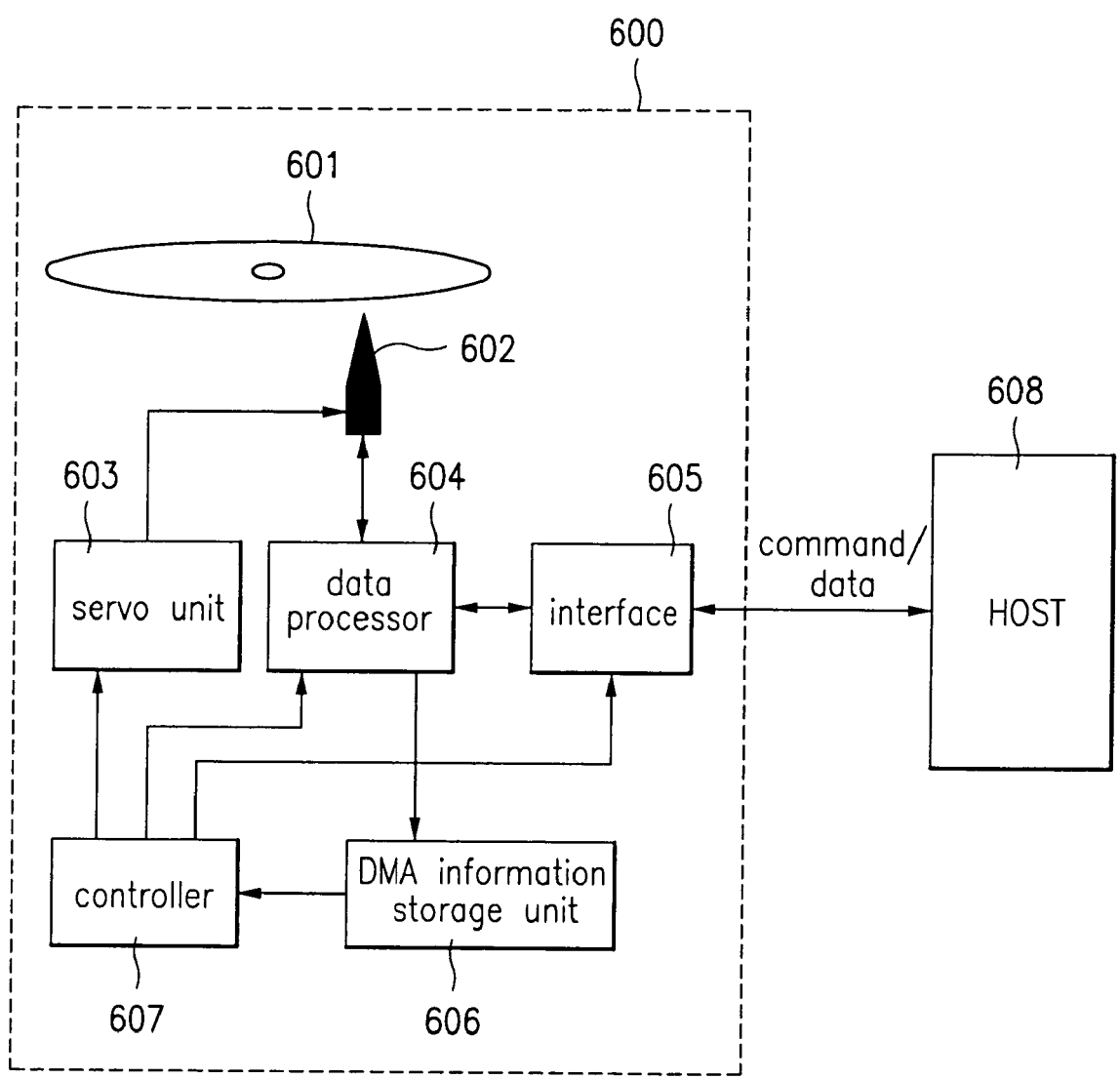
FIG. 6 is a block diagram of an optical disc recording/playback apparatus according to an embodiment of the present invention.

FIG. 6 shows an optical disc recording/playback apparatus according to an embodiment of the present invention comprising an optical pickup 602 recording and playing back data to and from an optical disc 601; a servo unit 603 controlling the optical pickup 602 to maintain a certain distance from an object lens of the optical pickup 602 to the optical disc 601, and to maintain a specified track; a data processor 604 processing the input data and transmitting the processed data to the optical pickup 602; a DMA information storage unit 606 reading and storing DMA information written in a DMA area of the optical disc via the data processor 604; an interface 605 transmitting and receiving data to and from an external host 608; and a controller 607 detecting whether a defective block exists during recording/playback of data and determining whether a linear replacement has been executed to the defective block. The interface 605 of the optical disc R/P apparatus is coupled to the host 608, such as a PC, and communicates commands and data with the host 608.

When a rewritable optical disc, for example a DVD-RAM, is inserted into the apparatus of the present invention, the SDL and PDL entries listed in the DMA area of the optical disc 601 are stored in the DMA information storage unit 606 through the data processor 604 under the control of the controller 607. At this time, the identification information indicating whether linear replacement has been performed with respect to a corresponding defective block is added into the DMA information stored in the DMA information storage unit 606.

For example, at least one bit of the reserved area in the existing SDL entry is assigned as the identification information (ID Info) bit. The ID Info bit is set to either a value of 1 or 0 to distinguish whether the linear replacement has been executed to the information listed in the SDL. Namely, the linear replacement algorithm is not performed when skipping algorithm is performed or when the spare area is full. In the present invention, the ID Info bit is called a linear replacement control (LRC) bit and shown in, e.g., FIG. 7A.

Referring to FIG. 7A, each SDL entry comprises an LRC area, an area for storing a sector number of the first sector of a block having defective sectors, and an area for storing a sector number of the first sector of a replacement block replacing the defective block. Because the LRC bit has a different meaning from the FRM bit, the FRM may also be included in the SDL. However, in this embodiment of the present invention, the FRM bit is not used.

As shown in FIG. 7B, a LRC bit value of 0 in the SDL entry means that the SDL entry was made while recording the data according to the linear replacement algorithm. As shown in FIG. 7C or 7D, a LRC bit value of 1 means that the SDL entry was made while recording the data according to the skipping algorithm rather than the linear replacement or while the spare area is full. When a defective block is found during recording of data according to the linear replacement algorithm, the data corresponding to the defective block is recorded in a replacement block and the LRC bit is reset to 0, provided that the spare area is not full. Otherwise, if the spare area is full, the linear replacement is not performed and the LRC bit is set to 1. Also, when a defective block is found while recording the data according to the skipping algorithm, the defective block is skipped and the LRC bit of an SDL entry corresponding to the defective block is set to 1.

Once a predetermined time has passed, for example, during the recording of data or after completing the recording, the controller 607 transmits information regarding the defective blocks to the host. At such time, the controller 607 can detect whether or not the corresponding SDL entry was made while recording the data according to the linear replacement algorithm based upon the LRC bit, thereby being able to transmit the correct information to the host. Accordingly, the host can appropriately command not to record/playback data in/from defective blocks listed in the SDL.

The host may issue a write/read command in view of the defective blocks listed in the SDL. Namely, the host would command not to record or playback data in or from defective blocks listed in the SDL. The optical disc R/P apparatus receives both the data and information of areas where data will be written in the optical disc, and reads the information regarding defective areas of the optical disc. The optical disc R/P apparatus detects whether the defective area information covers a defective block that is found during the recording; and detects whether a replacement block is assigned to the defective block based upon the identification information contained in the defective area information if the found defective block is covered by the defective area information. If a replacement block is assigned, writing the data in the assigned replacement block is performed and, if not, finding a new available replacement block to write the data therein is performed. The optical disc R/P apparatus further determines whether the defective block will be replaced with a replacement block if the defective block is not covered by the defective area information, and stores information on the defective block and the identification information to discriminate if a replacement block is assigned to the defective block in the defect management area of the disc based upon a result of the determination. The identification information is represented with at least one bit of a reserved area at a secondary defect list within the defect management area.

Thus, the optical disc R/P apparatus bypasses the defective blocks listed in the SDL while writing/reading the data. In such case, the LRC bit of SDL entry is set to 1 upon encountering a new defective block and location information of the defective block is entered. Since information regarding the replacement block is not necessary, the existing value is kept as is or a value of 0 is entered Alternatively, if the host issues a write/read command regardless of the defective block information in the SDL, the controller 607 of the optical disc R/P apparatus identifies the defective blocks listed in the SDL based upon the DMA information stored in the DMA information storage unit 606 during the data record/playback. If the read command is issued, whether a replacement block should be found can be determined based upon the LRC bit of the SDL entry where the defective block is listed. If the write command is issued, the LRC bit of an existing entry may change depending upon whether or not the linear replacement algorithm is performed. Here, a newly found defective block is processed in the same way as described above. For example, if a defective block listed in the SDL is found while recording data according to the skipping algorithm, the defective block is skipped and the LRC bit of the SDL entry corresponding to the defective block is set to 1.

At this time, if the information regarding a replacement block is written in the area for storing the sector number of the first sector of the replacement block in the SDL entry, the information is maintained as is. For example, a SDL entry of (0, blkC, blkG) as shown in FIG. 7B, means that data was recorded according to the linear replacement algorithm and a replacement block has been assigned. If such a SDL entry is met while recording data according to the skipping algorithm, the defective block blkC is skipped and the SDL entry is modified into (1, blkC, blkG) as shown in FIG. 7C.

Thus, the SDL entry of (1, blkC, blkG) as show in FIG. 7C, means that data was recorded according to the skipping algorithm, a defect occurred in block blkC, and the information regarding the replacement block blkG is maintained but not used during the record/playback. A SDL entry of (1, blkC, 0) as shown in FIG. 7D, means that data was recorded according to the skipping algorithm and a new defective block blkC was found and entered. If such SDL entry is found while recording the data according to the skipping algorithm, the defective block blkC is skipped and the SDL entry is maintained as is.

If the information regarding the replacement block of the spare area, which was previously listed in the SDL entry according to the linear replacement algorithm, is maintained in the SDL entry as it was while recording the data according to the skipping algorithm, the replacement block information can be used in subsequent recordings. In other words, when writing data into such defective block listed in the SDL according to the linear replacement algorithm, if the replacement block information does not exist, a replacement block for the defective block must be newly assigned to the spare area. However, if the information regarding the replacement block is maintained, the location of the replacement block previously assigned can be used as the newly assigned replacement block.

Figures 1, 2:
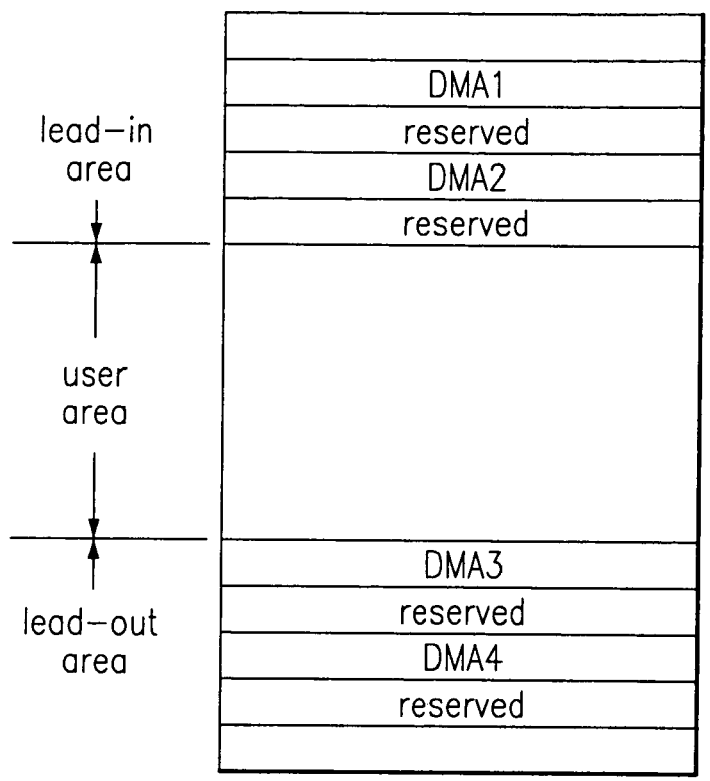
FIG. 1 shows a data area of a conventional optical disc.
FIG. 2 illustrates a structure of a conventional SDL entry.
Figure 3A:
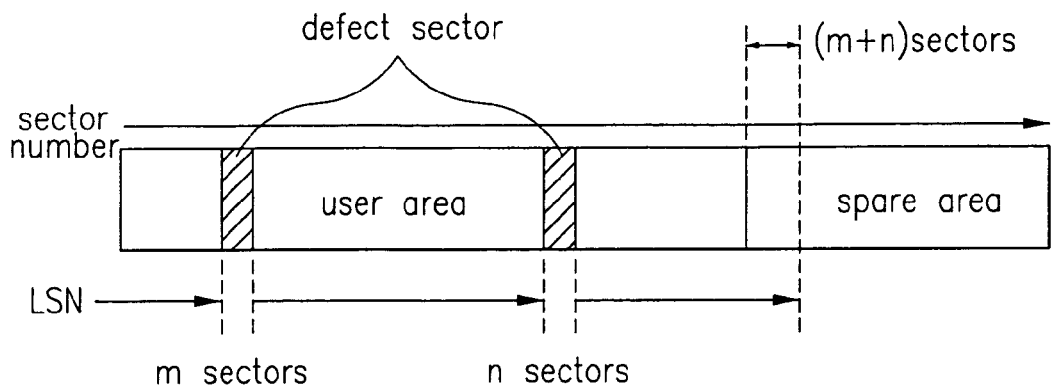
FIG. 3A illustrates a conventional slipping replacement algorithm.
Figure 3B:
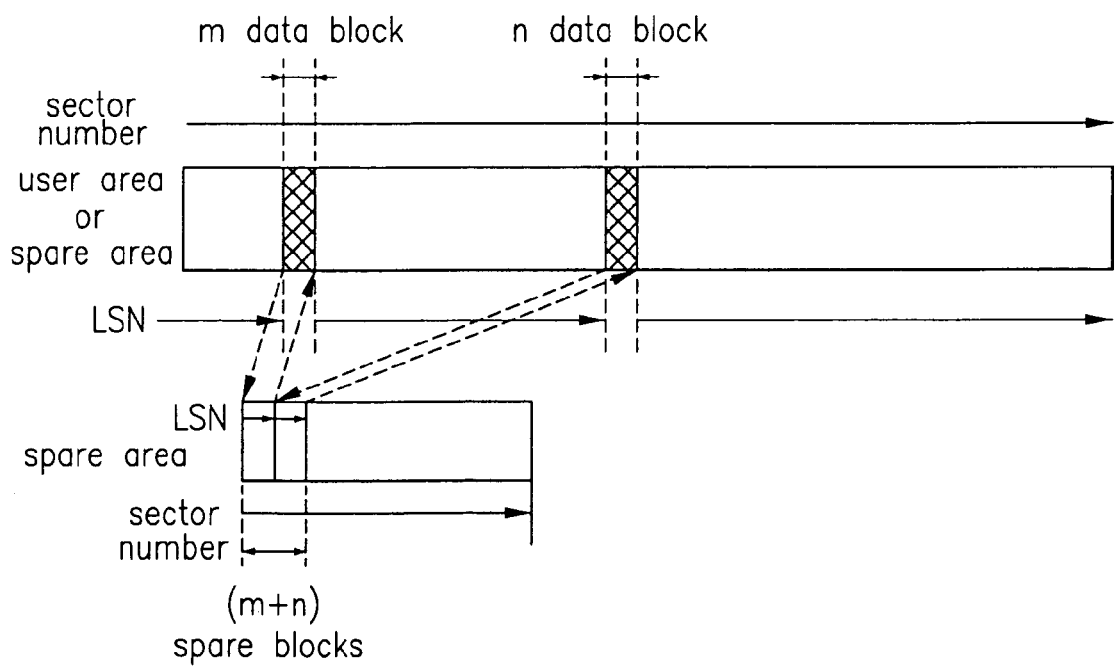
FIG. 3B illustrates a conventional linear replacement algorithm.
Figure 4A:
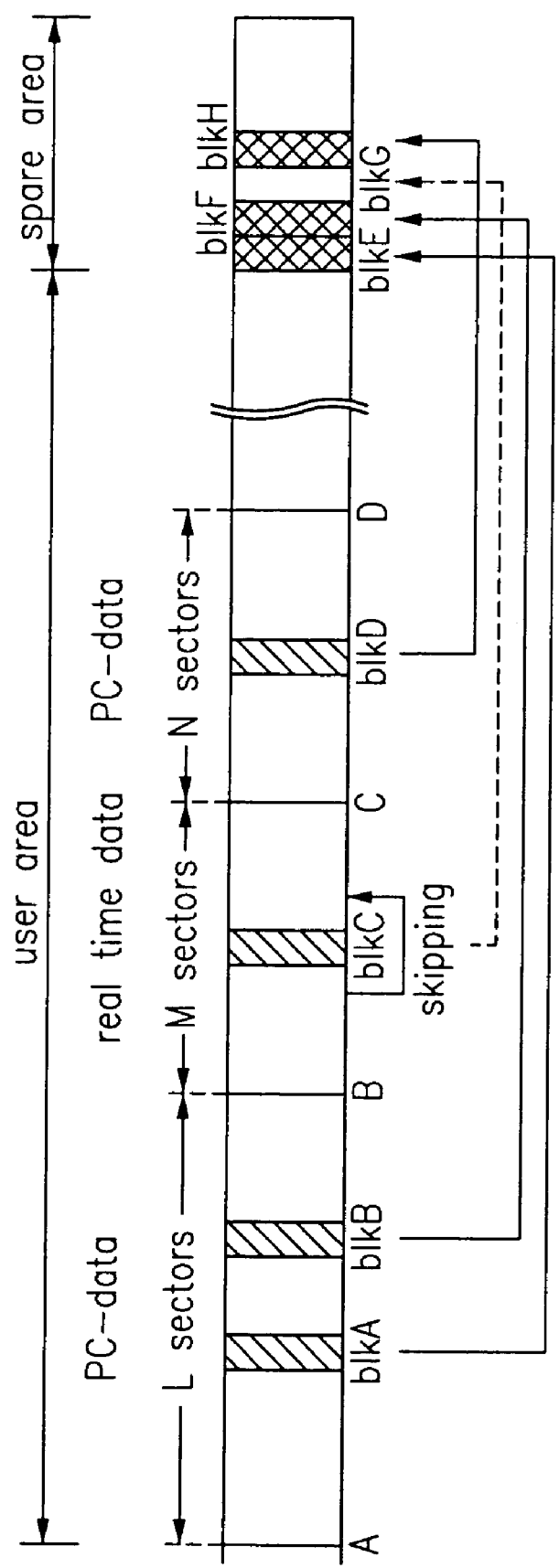
FIG. 4A illustrates a state of recording data according to the linear replacement algorithm or skipping algorithm when using SDL in the conventional optical disc.
Figure 5:
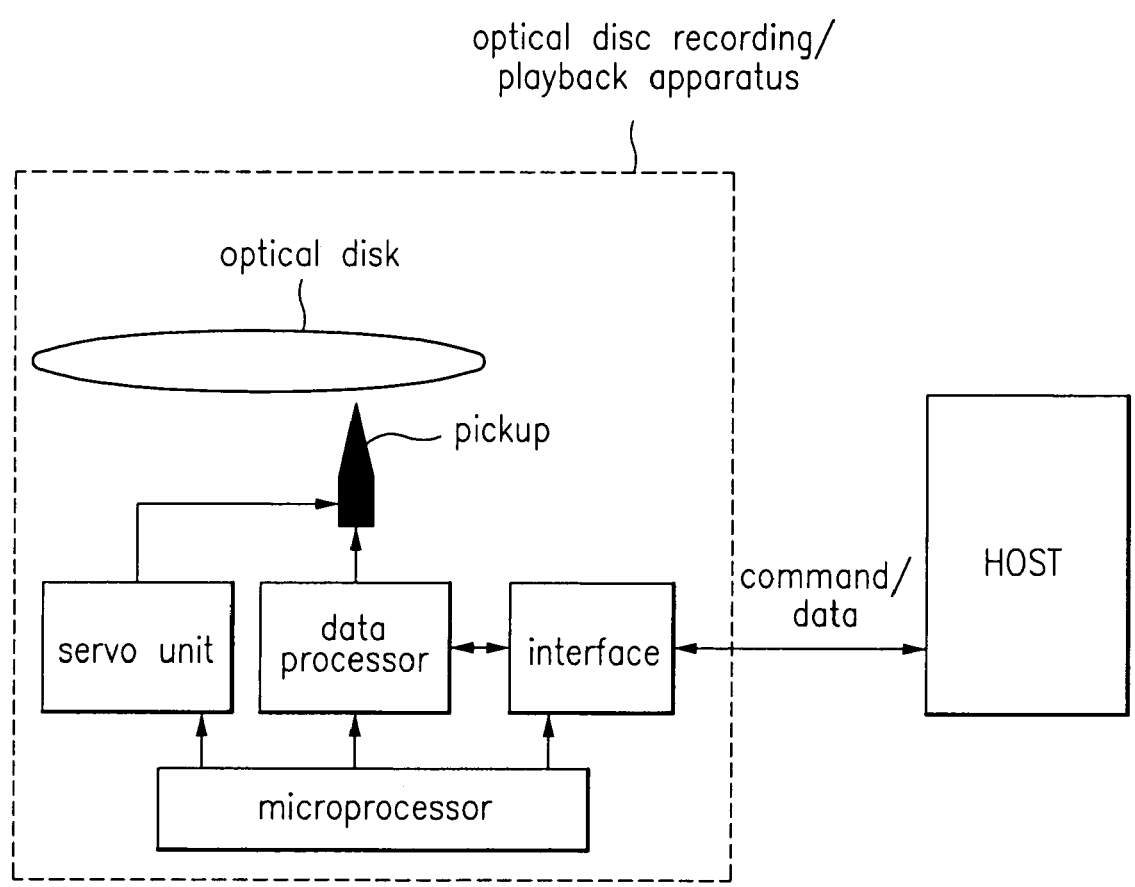
FIG. 5 is a block diagram of a conventional optical disc recording/playback apparatus.

For example, a block following the replacement block blkH, shown in FIG. 4A, is assigned as the new replacement block. Since a replacement block that was previously assigned cannot be re-used, the available capacity of the optical disc is reduced, thereby decreasing the efficiency of the optical disc. Therefore, if the replacement block information is maintained even while recording data according to the skipping algorithm, as described above, the replacement block previously assigned can be re-used as is when writing data according to the linear algorithm in a subsequent recording, thereby increasing the efficiency of the optical disc.

Specifically, if the information regarding the replacement block blkG, where data of the defective block blkC was written during the linear replacement recording, is kept in the SDL entry during the real time recording, the data of the defective block blkC is written not into a new replacement block in the spare area but into the replacement block blkG, which has already been assigned, during the next linear replacement recording.

Meanwhile, if a defective block requiring a new replacement block is found during the record/playback using the linear replacement, but there is no replacement block for the defective block, namely the spare area is full (provided the DMA has redundancy), the LRC bit value of the SDL entry is set to 1. At this time, a replacement block does not exist. As a result, the replacement block information is not listed and the location information of the defective block is listed as shown in FIG. 7D. If the spare full flag and the LRC bit is set to 1 during the playback or recording, data of the defective block cannot be read and data cannot be written in the defective block because the replacement block for the defective block does not exist and the linear replacement cannot be executed.

FIGS. 8A and 8B are flow charts showing the above operations of the optical disc R/P apparatus according to an embodiment of the present invention. If there is data to be recorded, the host inputs a write command and if there is playback of data, the host inputs a read command, via the interface of the optical disc R/P apparatus (800). Once a write or read command is received from the host, the controller 607 of the optical disc R/P apparatus determines whether the input data requires a real time recording/playback (802).

When the data is determined to require real time recording, the apparatus starts to write the data on a location of the LBA designated by the host (804). A determination is made whether the writing of data is completed (806) and if a defective block is found when the writing of data is not completed (808), the defective block is skipped and the data is written in a next normal block (810). Information regarding the skipped defective block is entered in the SDL (812) and sent to the host (814). This information is entered in a way distinguishable from an information of a defective block found while performing the linear replacement algorithm. Thus, the controller 607 can distinguish SDL entry made while recording data according to the skipping algorithm from a SDL entry made while recording data according to the linear replacement algorithm. For this purpose, the LRC bit of the SDL is set to 1 and the location information of the defective block is entered in the SDL entry.

The defective block found in step 808 may be a newly encountered defective block or a block already listed in the SDL. If the defective block is not listed in the SDL, the defective block is new and the location information regarding the defective block is listed in the SDL entry by setting the LRC bit to 1, such as (1, blkC, 0) shown in FIG. 7D. If the defective block is listed in the SDL, the SDL is corrected by setting the LRC bit to 1 and maintaining the information regarding the replacement block, such as (1, blkC, blkG) shown in FIG. 7C. Such procedure is performed until the recording of data by the write command of the host is completed. If the writing is completed (806), the controller 607 transmits a command execution report to the host (816).

When the data is determined to require real time playback, the apparatus starts to read the data from a location of the LBA designated by the host (804). As in the recording, a determination is made whether reading of data is completed (806). However, if a defective block is found when the reading of data is not completed (808), the defective block may skipped, a partially correct data may be read from the defective block or zero padding data may be returned (not shown in FIG. 8A). Information regarding the skipped defective block is entered in the SDL (812) and sent to the host (814). Such procedure is performed until the playback of data by the read command of the host is completed. If the reading is completed (806), the controller 607 transmits a command execution report to the host (816).

During recording/playback, the controller 607 may send the information regarding the defective block to the host in various ways. For example, the defective block information can be embedded in a header for transmission to the host, or a new command allowing recognition of the skipped block can be generated and transmitted to the host, or the defective block information may be transmitted together with the command execution report to the host after completing the recording/playback of the real time data.

If it is determined that the data to be recorded does not require real time recording in step 802, namely the data is PC-data, the controller 607 writes/reads the data starting on/from the LBA designated by the host (820). If a read command is received, the playback is carried out starting from the LBA designated by the host and if a write command is received, the recording is carried out starting from the LBA designated by the host. When writing/reading of data is not completed (822) and if a defective block is found (824), a determination is made whether the defective block is listed in the SDL (826).

If the defective block is not listed in the SDL, a replacement block from the spare area is assigned. Thus, the spare full flag is checked to determine whether there are any available replacement blocks, i.e. whether the spare area is full (828). A spare full flag of 1 indicates that there are no available replacement blocks. If there are no available replacement blocks, the LRC information in the SDL is set to 1, the location information of the defective block is listed and the location information of the replacement block is set to 0, such as (1, blkC, 0) shown in FIG. 7D (830). The information on defective block is transmitted to the host (832) and a report of an error in the recording/playback process is sent to the host (834).

If the spare area is not full during writing of data, a replacement block is assigned and the data to be written in the defective block is written in the replacement block (836). Also, the location information of the defective block and the replacement block is listed in the SDL and the LRC information in the SDL is set to 0, such as (0, blkC, blkG) shown in FIG. 7B (836). The information on defective block is transmitted to the host (838) and the process returns to step 820 to record more data (840).

During reading of data, even if there are available replacement blocks, data cannot be read from the defective block. Accordingly, a report of an error in the playback is sent to the host (840). However, the information on the defective block may be transmitted to the host for future use (838) and a replacement block may even be assigned for use in the next recording (not shown). If a replacement block is assigned, the location information of the defective block and the replacement block is listed in the SDL and the LRC information in the SDL is set to 0 in step 836.

If the defective block is listed in the SDL, a further determination is made whether a replacement block has been assigned (842). Namely, if the LRC bit is 0, the SDL entry was made previously while recording/playback of data according to the linear replacement algorithm. Thus, the recording/playback is continued according to the linear replacement algorithm (844) and the process returns to step 820 for more recording/playback of data. In other words, if a replacement block is assigned to the SDL entry, the optical pickup is moved to the replacement block and the data is written/read in/from the replacement block. If the LRC bit of the SDL entry is 1 and a replacement block is listed, such as (1, blkC, blkG) shown in FIG. 7C, the listed replacement block is used to perform the linear replacement and the LRC bit is corrected to 0, making the SDL entry to (0, blkC, blkG) shown in FIG. 7B.

If the assigned replacement block is defective, a new replacement block may be assigned according to the direct pointer method and the data is then written/read in/from the assigned replacement block. However, if the spare area becomes full prior to the DMA and there is no replacement block to be assigned, the location information of the defective block of the SDL entry is maintained and the LRC bit is changed into 1, such as (1, blkC, 0) shown in FIG. 7D, indicating not to execute the linear replacement.

If a replacement block has not been assigned in the SDL entry, the spare full flag is checked to determine whether there are any available replacement blocks (846). Namely, if the LRC bit of the SDL entry is set to 1, the SDL entry may have been made while data was written/read according to the skipping algorithm or while the spare area was full. Accordingly, if there are no available replacement blocks, i.e. the spare area is full, a report of a write/read error in the recording/playback process is sent to the host (834). However, when formatting an optical disc whose spare area is full, the SDL may be moved to the PDL depending upon the formatting method, such that the spare area may no longer be full. In any case, if the spare area is not full, the process is the same as when the spare area is not full for defective blocks not listed in the SDL (836-840).

The above procedure for non real time data is carried out until the recording/playback of data by the writing/reading command of the host is completed. If the writing/reading is completed, the controller 607 sends a command execution report to the host (848). Here, the controller 607 sends the information regarding the skipped defective block to the host in the various methods as described above with reference to FIG. 8A, step 816.

In a second embodiment of the present invention, the definition of the FRM is changed to distinguish a linear replacement from a skipping replacement. If a defective block blkC is found while recording data according to the skipping algorithm in real time, the SDL entry is listed as (0, blkC, 0) shown in FIG. 9. At this time, a replacement block is not needed, so the information regarding the replacement block in the spare area is not changed or is listed as 0. Only the definition of the FRM changes.

For example, if FRM and the replacement block are both 0, it is modified to be recognized as indicating a defective block found while performing the skipping algorithm or as indicating an assigned replacement block rather than a defective case of performing the linear replacement. This is because the defective block, even if found during the real time recording, is skipped and a replacement block for the defective block does not exist in the spare area. In addition, this aims at distinguishing the SDL entry listed according to the skipping algorithm from the SDL entry listed according to the linear replacement algorithm. Even under the condition that the area between B and C in FIG. 4A was listed according to the linear replacement algorithm and the defective block information such as (0, blkC, blkG) was kept as the SDL entry, if the area is used for rewriting according to the skipping algorithm, the SDL entry is modified into (0, blkC, 0).

In sum, the present invention has the following advantages. Primarily, since the controller can detect existence/non-existence of the linear replacement based upon the LRC bit assigned to each SDL entry, the optical disc R/P apparatus (namely, a drive) can transmit the correct information to the host. Accordingly, even if incorrect data of skipped blocks, namely previous data written in the skipped blocks is reproduced by the optical disc R/P apparatus and transmitted to the host during the reproduction of data, the host discards the data of the skipped blocks and reads only the data of normal blocks based upon the defective block information received from the controller. In other words, the present invention can prevent an error occurring when the host does not know the information regarding the skipped blocks.

If a replacement block has not been assigned in the SDL entry, the spare full flag is checked to determine whether there are any available replacement blocks (846). Namely, if the LRC bit of the SDL entry is set to 1, the SDL entry may have been made while data was written/read according to the skipping algorithm or while the spare area was full. Accordingly, if there are no available replacement blocks, i.e. the spare area is full, a report of a write/read error in the recording/playback process is sent to the host (834). However, when formatting an optical disc whose spare area is full, the SDL may be moved to the PDL depending upon the formatting method, such that the spare area may no longer be full. In any case, if the spare area is not full, the process is the same as when the spare area is not full for defective blocks not listed in the SDL (836-840).

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A computer-readable storage medium having a data structure for defect management information stored on the storages medium, wherein the defect management information includes at least one of first, second and third entries, the first entry for indicating that a defective block is replaced with a spare block and a position of the spare block is designated, the second entry for indicating that a defective block is not replaced and a position of a spare block is designated or maintained, and the third entry for indicating that a defective block is not replaced and a position of a spare block is not designated, wherein the third entry generated during a previous recording or reproducing is changed to the first entry regarding the defective block when the current recording or reproducing is non real time data and a spare area is assigned.

2. The storage medium of claim 1, wherein the first, second or third entry is specified by indication information for indicating whether or not a defective block is replaced with a spare block and position information for indicating the position of the spare block within a spare area.

3. The storage medium of claim 1, wherein the first entry is generated regarding the defective block when non real time data is recorded or reproduced and a spare area is not full.

4. The storage medium of claim 3, wherein the first entry generated during a the current recording or reproducing is changed to the second entry regarding the defective block when next recording or reproducing is real time data, wherein the position of the spare block is maintained.

5. The storage medium of claim 1, wherein the second entry is generated regarding the defective block when next real time data is recorded on an area where current non real time data is recorded.

6. The storage medium of claim 4, wherein the next real time data is not recorded or reproduced on or from a defective block and recorded or reproduced on or from next available block.

7. The storage medium of claim 1, wherein the third entry is generated regarding the defective block when real time data has been recorded or reproduced previously.

8. The storage medium of claim 7, wherein data is not recorded or reproduced on or from the defective block when the real time data has been recorded or reproduced previously.

9. The storage medium of claim 1, wherein the third entry is maintained regarding the defective block when a spare area is full, during the current recording or reproducing of the non real time data.

10. The storage medium of claim 1, wherein each of the first to third entries further includes a position of a defective block.

11. The storage medium of claim 1, wherein the first entry generated during a current recording or reproducing is changed to the second entry regarding the defective block when the next recording or reproducing is real time data, wherein the position of the spare block is maintained.

12. An apparatus for managing a defective block, comprising:
a pickup unit configured to record or read data to or from a recording medium;
a signal processor, coupled to the pickup unit, to process the data to be recorded or read by the pickup unit for data recording or reproducing; and
a controller configured to control a defect management operation regarding a defective block in the recording medium, wherein the controller is configured to issue defect management information including at least one of first, second and third entries, the first entry indicating that a defective block is replaced with a spare block and a position of the spare bock is designated, the second entry indicating that a defective block is not replaced and a position of a spare block is designated or maintained, and the third entry indicating that a defective block is not replaced and a position of a spare block is not designated,
wherein the controller is configured to change the third entry generated during a previous recording or reproducing to the first entry regarding the defective block when the current recording or reproducing is non real time data and a spare block is assigned.

13. The apparatus of claim 12, wherein the controller is configured to specify the first, second or third entry by indication information for indicating whether or not a defective block is replaced with a spare block and position information for indicating the position of the spare block within a spare area.

14. The apparatus of claim 12, wherein the controller is further configured to issue the first entry regarding the defective block when non real time data is recorded or reproduced and/or a spare area is not full.

15. The apparatus of claim 14, wherein the controller is further configured to change the first entry generated during the current recording or reproducing of the non real time data to the second entry regarding the defective block when next recording or reproducing is real time data, wherein the position of the spare block is maintained.

16. The apparatus of claim 12, wherein the controller in configured to issue the second entry regarding the defective block when next real time data is recorded on an area where current non real time data is recorded.

17. The apparatus of claim 15, wherein the controller is further configured to control the defect management operation so that the next real time data is not recorded or reproduced on or from a spare block.

18. The apparatus of claim 12, wherein the controller is configured to issue the third entry regarding the defective block when real time data has been recorded or reproduced.

19. The apparatus of claim 18, wherein the controller is configured to control the defect management operation so that data is not recorded or reproduced on or from the defective block when the real time data has been recorded or reproduced previously.

20. The apparatus of claim 12, wherein the controller is configured to maintain the third entry regarding the defective block when a spare area is full, during the current recording or reproducing of non real time data.

21. The apparatus of claim 12, wherein the controller is configured to issue each of the first to third entries further including a position of a defective block.

22. The apparatus of claim 12, wherein the controller is further configured to change the first entry generated during the current recording or reproducing to the second entry regarding the defective block when the next recording or reproducing is real time data, wherein the position of the spare block is maintained.

23. A system for managing a defective block, comprising:
a recording/reproducing device configured to record or reproduce data, the recording/reproducing device including
a pickup unit configured to record or read data to or from a recording medium,
a signal processor, coupled to the pickup unit, to process the data to be recorded or read by the pickup unit for data recording or reproducing, and
a controller configured to control a defect management operation regarding a defective block present on the recording medium, wherein the controller is configured to issue defect management information including at least one of first, second and third entries, the first entry indicating that a defective block is replaced with a spare block and a position of the spare block is designated, the second entry for indicating that a defective block is not replaced and a position of a spare block is designated or maintained, and the third entry for indicating that a defective block is not replaced and a position of a spare block is not designated, wherein the controller is configured to change the third entry generated during a previous recording or reproducing to the first entry regarding the defective block when the current recording or reproducing is non real time data and a spare block is assigned; and
a host device, coupled to the recording/reproducing device through an interface, for controlling data recording or reproducing,
wherein the host device is configured to transmit a write/read command to record or reproduce the data to the recording/reproducing device and receive a report associated with the data recording or reproducing from the recording/reproducing device through the interface, and the recording/reproducing device is configured to perform the data recording or reproducing according to the write/read command and transmit the report to the host device according to the data recording or reproducing through the interface.

24. The system of claim 23, wherein the host device is further configured to receive the defect management information before and/or after the data recording or reproducing and control the recording/reproducing device according to the received defect management information.

25. The system of claim 24, wherein the host device is further configured to transmit a write/read command to the recording/reproducing device by referring to the received defect management information.

26. The system of claim 23, wherein the host device is configured to transmit a write command indicating whether real time recording is required, and the controller of the recording/reproducing device is configured to issue at least one of the second entry and third entry according to the write command.

27. An apparatus for managing a defective block, comprising:
a pickup unit configured to record or read data to or from a recording medium;
a signal processor configured to process data to be recorded or read by the pickup unit; and
a controller configured to control a defect management operation regarding a defective block, by issuing defect management information including at least one of first, second and third entries, the first entry including a status information to indicate that a defective block is replaced with a spare block and first position information to specify a location of defective block and a second position information to specify a location of the spare block, the second entry including a status information to indicate that a defective block is not replaced and first position information to specify a location of defective block and second position information to specify a location of a spare block, and the third entry including a status information to indicate that a defective block is not replaced and first position information to specify a location of the defective block,
wherein the controller is configured to change the third entry generated during previous recording or reproducing or real time data to the first entry including second position information to specify a location of a spare block, regarding the defective block, when the current recording or reproducing is non real time data and a spare block is assigned.

28. The apparatus of claim 27, wherein the controller is further configured to control the signal processor to generate the third entry in the previous recording or reproducing of real time data and the second entry in the current recording or reproducing of non real time data.

29. The apparatus of claim 28, wherein the controller is further configured to control the pickup unit to record the third entry generated in the previous recording or reproducing of real time data on a defect management area of the recording medium, and record the first entry generated in the current recording of reproducing of non real time on the defect management area of the recording medium.

30. The apparatus of claim 27, wherein the controller is configured to change the status information of the third entry to an alternative value to indicate that the defective block is replaced, while including the second information to specify the location of the spare block, thereby issuing the first entry.

31. The apparatus of claim 27, wherein the controller is further configured to control the pickup unit so that the defective block is not replaced with a spare block during previous recording or reproducing of the real time data, while the defective block is replaced with a spare block during current recording or reproducing of the non real time data.

* * * * *